July 14, 1936.  H. W. ZIMMERMAN  2,047,607
GAUGING DEVICE
Filed Oct. 16, 1933
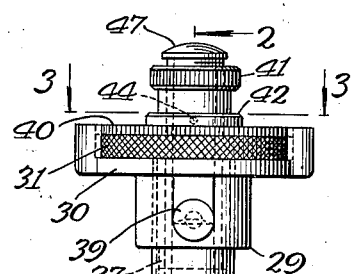
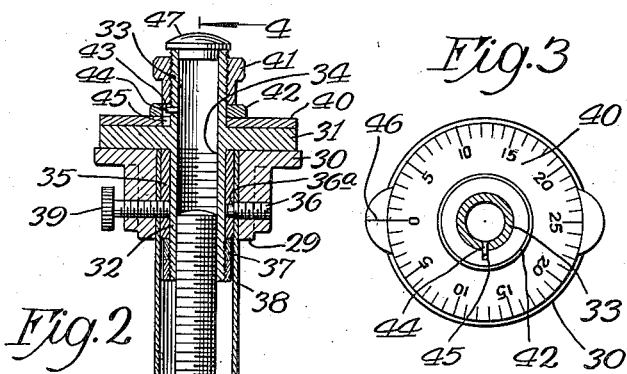
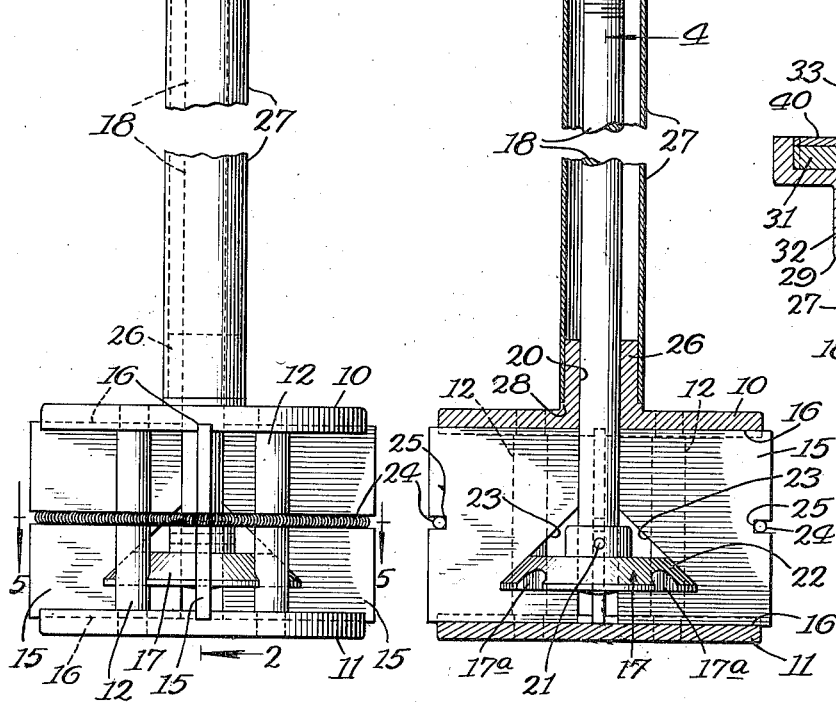
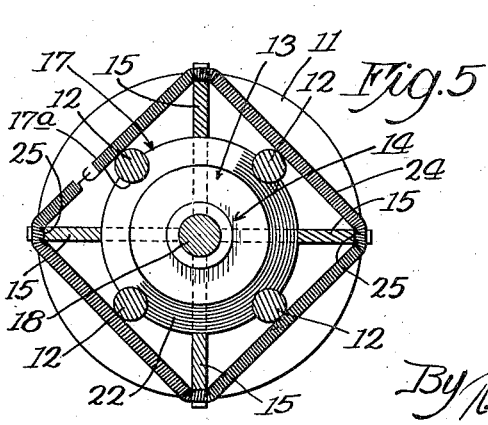
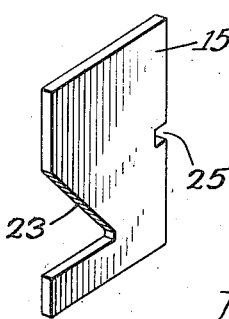
Inventor
Herman W. Zimmerman
By Reuter, Hitter, Davis & Macauley Attys.

Patented July 14, 1936

2,047,607

UNITED STATES PATENT OFFICE 2,047,607

GAUGING DEVICE

Herman W. Zimmerman, Chicago, Ill., assignor to Automotive Maintenance Machinery Co., Chicago, Ill., a corporation of Illinois Application October 16, 1933, Serial No. 693,737

12 Claims. (Cl. 33—178)

This invention relates generally to gauging devices, and it has to do particularly, but not exclusively, with cylinder gauges which are well suited for measuring inside diameters, detecting wear and out-of-shape conditions of cylinders, determining variations in cylinder bore surfaces, and comparing cylinder sizes.

One of the objects of the invention is to provide an improved device adapted for the foregoing purposes.

Another object is to provide an improved adjusting mechanism for gauging devices of the foregoing character.

A further object is to provide a simple and inexpensive cylinder gauge which is strong and durable, which will withstand rough handling without impairing its ability to measure and indicate accurately, and which is not affected by wear.

Additional objects are to provide a device of the foregoing character which may be easily and quickly adjusted, which reduces the possibility of error to the very minimum, which provides for maintenance of adjustments once they are effected, and which may be used by unskilled workmen with a high degree of accuracy.

Other objects and advantages will become apparent as this description progresses and by reference to the drawing, wherein,—

Figure 1 is an elevational view of one form of device embodying the invention;

Fig. 2 is a section taken substantially on line 2—2 of Fig. 1;

Fig. 3 is a section taken substantially on line 3—3 of Fig. 1;

Fig. 4 is a section taken substantially on line 4—4 of Fig. 2;

Fig. 5 is a section taken substantially on line 5—5 of Fig. 1; and

Fig. 6 is a detail perspective view of one of the gauging blades employed in the tool of the previous figures.

The device shown in the drawing includes a cage-like frame having end plates 10 and 11 (Figs. 1 and 2) secured together in uniformly-spaced relation by a plurality of annularly arranged posts 12. These posts (Fig. 5) define a plurality of radial passageways 13 and an axially located center space 14.

Gauge blades 15 are mounted in the radial passageways 13 (Figs. 1, 2, 5 and 6) for expansion and contraction movements in the following manner: The end plates 10 and 11 are provided, in their confronting faces, with aligned radial grooves 16 in which the opposite ends of the blades 15 are snugly and slidingly received for sole guidance and support of the same in their contraction and expansion movements. It will be noted that the grooves 16 extend from the periphery of the end plates 10 and 11 to substantially the center of such plates whereby a long and substantial support is provided for the gauge blades. With such supporting arrangement, the blades 15 are substantially supported throughout their entire range of adjustment in radial direction. Also, with this arrangement, various width gauge blades may be employed to vary the size-range of the tool and, regardless of the size of these blades, substantial support is provided for the same throughout the range of adjustment thereof. Although different sized gauge blades may be employed, it will be appreciated that with this particular form of blade support any particular size of blade will afford a wide range of adjustment and will serve for gauging of a wide range of cylindrical bore sizes.

Adjustment of the gauge blades 15 is accomplished by a cone-spreading device 17 mounted within the center space 14 of the gauge frame and adapted to engage the inner edge surfaces of the gauge blades 15. Specifically, a center stem 18 is mounted in the center space 14, the same being slidably received and guided in a centrally-disposed opening 20 in the upper end plate 10. The cone-spreader 17 is concentrically fixed to the lower end of this stem 18 by a pin 21. The spreader 17 is also provided with peripheral notches 17ª which receive the posts 12 thereby preventing rotation of the spreader but permitting longitudinal or axial movement of the same. This cone-and-post connection also strengthens and adds to the rigidity of the tool structure and opposes any torsional strains and stresses that may tend to otherwise distort the tool frame.

The cone-spreader 17 (Fig. 2) is provided with a tapered surface 22 which engages complementally tapered surfaces 23 on the inner edges of the gauge blades, whereby, as the cone-spreader 17 is shifted axially toward the end plate 10, the gauge blades 15 are simultaneously expanded to similar extents. It will be noted that the gauge blade surfaces 23 are of such steepness and extend inwardly of the blade surfaces to such an extent that the full range of movement of the cone-spreader affords a comparatively wide range of expansion movement of the blades.

The gauge blades 15 are yieldably held seated against the cone-spreader 17 by a spring ring 24 mounted in notches 25 located in the central part of the outer edges of the gauge blades. The spring ring 24 yieldably opposes the expansion movement of the gauge blades, retains the same in assembled condition and contracts the blades when contraction movement thereof is permitted by movement of the cone-spreader 17 downwardly or toward the lower end plate 11.

It is highly desirable that devices of this character be arranged for measuring, checking, etc. cylinder, and the like, bores of varying depth. In that case, the adjusting mechanism, for ease and accuracy in adjustment of the device, should be located remotely from the gauging blades and at a point readily accessible to the operator when the tool is in the lowermost part of the bore.

To the foregoing end, the upper end plate 10 is provided with a comparatively short, central and integral tubular extension 26 which coincides with the end plate opening 20 (Fig. 2). A comparatively long tubular shell 27 has its lower end force-fitted upon the end plate extension 26, the latter being slightly reduced in outside dimension to enter the shell 27 and to provide a shoulder 28 against which the lower end of the shell abuts.

The center adjusting stem 18 is of sufficient length to extend through the end plate extension 26 (where it finds slide support) and on through the shell 27 to a point adjacent the upper end of the latter where it is associated with exterior adjusting means which will now be described.

The upper end of the shell 27 is snugly received within the depending cylindrical shank 29 of a cage member 30, these parts being, preferably, force-fitted together to normally prevent separation thereof (Figs. 2 and 4). The cage member 30 is provided with an open-sided pocket in which there is rotatably mounted an adjusting nut 31. The open sides of the cage 30 permit ready access to the peripheral edge of the adjusting nut 31 so that the same may be readily grasped and manipulated to adjust the tool.

The adjusting nut 31 is provided with a centrally-disposed, depending tubular extension 32 and an upstanding, centrally-disposed tubular extension 33, the bores of both of which tubular extensions are interconnected by an aligned opening 34 through the body of the nut. The depending tubular part 32 extends downwardly and axially within the upper end of the shell 27 where it is operatively connected to the upper end of the adjusting stem 18. The bore of the extension 32 and the upper end of the stem 18 are threaded for complemental engagement of these parts.

The adjusting nut 31 is secured for rotational movement thereof without axial or longitudinal displacement as follows: The outside diameter of the extension 32 is less than the inside diameter of the shell 27 and a sleeve 35 is mounted between these parts surrounding the extension 32 at the upper end of the shell. The sleeve 35 is fixedly secured to the shell by a set screw 36 passing through the cage 30, shell 27, and the sleeve. The end of the set screw passing through the sleeve 35 is reduced providing a shoulder 36ª thereon which abuts the sleeve and prevents the screw 36 from being screwed inwardly far enough to engage and interfere with the rotation of the nut extension 32. The adjusting nut extension 32 rotates freely within the sleeve 35 and is of such length that its lower end, which is externally threaded, extends a considerable distance below the lower end of the shell 35. The lower threaded end of the extension 32 receives a nut 37 which is adjusted to such a position with respect to the lower end of the extension 32 that the adjusting nut 31 may be freely rotated, but it is retained against outward longitudinal displacement move-ment. A lock nut 38 is mounted on the extreme lower threaded end of the extension 32 for holding the nut 37 in its predetermined adjusted position. With this arrangement, outward displacement movement of the nut 31 is prevented by the nut 37 and its displacement in the opposite direction is prevented by the cage member 30. It will be obvious from the foregoing that, to adjust the gauge blades 15 in expanding direction, the adjusting nut 31 may be rotated clockwise to, in turn, move the adjusting stem 18 and cone-spreader 17 upwardly; and the gauge may be contracted by movement of the nut 31 in the opposite direction.

When the gauge has been set in any desired adjusted position, the parts may be locked in that condition by the actuation of a locking screw 39. This locking screw is carried by the depending shank 29 of the cage member 30 and its inner end extends through the adjacent wall of the shell 27 and sleeve 35 to frictionally engage the depending extension 32 of the adjusting nut 31. By tightening the screw 39, the extension 32 and the nut 31 will be held against rotation, and any adjustment of the blades 15 previously effected will be maintained.

The gauge structure so far described is well suited for the checking of cylindrical bores, such as the cylinders of internal combustion engines, to determine, with respect to new or reground cylinders whether they are truly cylindrical and with respect to used cylinders, whether they are in an out-of-shape worn condition. It may be readily used to indicate whether or not bores require various dressing operations to bring them to proper shape and size. It may be used in checking and comparing cylindrical bores. For example, in the grinding of the cylinders of an internal combustion engine, the gauge may be employed to determine the condition of one particular cylinder and how much material should be removed from that cylinder to bring it to proper shape; and, once that has been determined, the gauge may be employed in measuring and comparing the other cylinders of the engine to bring them all to the same desired shape and size. In the reconditioning of the cylinders of an internal combustion engine, it may be necessary to install new pistons and the gauge embodying my invention may be employed to the end of positively determining proper piston sizes. That is to say, once the cylinders have been reground, the gauge tool may be inserted therein and adjusted to the cylinder size. The tool may be locked in that condition, then removed from the cylinder and taken to the supply source of the pistons where comparative sizes may be accurately determined in order to secure the proper oversize piston.

To facilitate the foregoing measuring, detecting and checking operations, I provide a novel indicating means (Figs. 2, 3 and 4) which is associated directly with the adjusting nut 31. Specifically, I employ an indicating plate 40 (Fig. 3) having a scale thereon which preferably, but not necessarily, indicates thousandths. This plate 40 is provided with a central opening of substantially the size of the upstanding extension 33 on the nut 31 so that the plate will pass freely down thereover to seat upon the top of the nut 31. The upper end of the extension 33 is externally threaded to receive a locking nut 41 which, when screwed downwardly, engages a washer member 42 which is seated upon the top of the indicator plate 40. The washer 42 is provided in its inner edge with a keyway 43 in which is received a key 44 carried by the extension 33, whereby rotation of the washer 42 is prevented; thereby, in turn, preventing rotation of the indicator plate 40 when the locking nut 41 is screwed downwardly to fix the parts in adjusted condition. The central opening of the indicator plate 40 is provided with a small key slot 45 to permit the same to readily pass by the extension-carried key 43 when such plate is installed upon the nut 31. The outer end of the extension 33 is closed by a plug 47, the latter being force-fitted into the extension after the nut 41 is assembled.

With the foregoing arrangement, the indicator plate 40 may be set at any desired position relative to the adjusting nut 31 and relative to the gauge mark 46 on the cage member 30. To do this, it is only necessary to loosen the nut 41, rotate the plate 40 to the desired position and then tighten the nut 41. By preventing rotation of the washer 42, the setting of the dial plate remains undisturbed when the nut 41 is tightened.

In the use of the indicator structure, the gauge may be adjusted to a predetermined size and the zero mark of the plate set to coincide with the mark 46. The gauge may then be used to determine variations of any particular bore from such size, this being indicated by the changed position of the zero mark of plate 40 with respect to the mark 46. This manipulation may be found quite useful in the regrinding of a plurality of cylinders in a single cylinder block, to the end that they may all be ground to substantially the same size. With this arrangement of adjusting nut, indicator plate and gauge blades, accurate measurements may be made regardless of wear of any of the parts of the structure as a whole.

The advantages of the invention above stated, as well as the operation of the same, will be obvious from the foregoing. It is to be understood that, while I have shown and described only one form of structure embodying my invention, other changes in details and arrangement of parts may be made without departing from the spirit and scope of my invention as defined by the claims which follow.

I claim:

1. Gauge structure which includes a frame having spaced end plates with radially-directed grooves in their confronting faces with the grooves in one end plate parallel with corresponding grooves in the other end plate, gauge blades having their opposite ends slidably mounted in said parallel grooves for sole radial guidance and support thereof and having inner opposed edges which are oppositely inclined, an expanding member mounted centrally within said frame and engaged with the inner inclined edges of said blades, an axially shiftable support for said expanding member, shiftable in one direction to move said expanding member to expand said blades and shiftable in the opposite direction to move said expanding member to permit contraction of said blades, exteriorly accessible and readily detachable means engaged with said blades yieldably opposing their expansion movement and contracting the same when said axially shiftable support is moved in said opposite direction, and means for shifting said support axially which includes a tubular member shielding said support, an adjusting member rotatably carried by said tubular member, and an adjustable connection between said adjusting member and said support.

2. Gauge structure which embodies a frame having slideways therein, gauge blades mounted in and guided in said slideways for radial expansion and contraction movements, an axially shiftable member in said frame for expanding said blades, readily detachable means for holding said blades and axially shiftable member in operative engagement and for contracting said blades; and means for axially shifting said shiftable member which includes an elongated stem connected to said shiftable member and slidably supported by said frame, an elongated tubular extension on said frame enclosing said stem, a rotatable adjusting member carried by the outer end of said tubular extension and having a depending tubular part projecting within said tubular extension, an adjustable connection between said tubular part and the adjacent end of said stem whereby rotation of said adjusting member shifts said stem and shiftable member axially, and means between said adjusting member and said tubular extension preventing longitudinal displacement of said adjusting member while permitting of rotation of the latter.

3. Gauge structure which embodies a frame having slideways therein, gauge blades slidably mounted in and guided in said slideways for radial expansion and contraction movements, an axially shiftable member in said frame for expanding said blades, releasable means for holding said blades engaged with said axially shiftable member and for contracting said blades, and means for axially shifting said shiftable member which includes an elongated stem connected to said shiftable member and slidably supported by said frame, an elongated tubular extension on said frame enclosing said stem, an adjusting member carried by the outer end of said tubular extension for rotational movement only and having a depending tubular part projecting within said tubular extension, an adjustable connection between said tubular part and the adjacent end of said stem whereby rotation of said adjusting member shifts said stem and shiftable member axially, and means adjustably supported by said tubular extension and engageable with said tubular part for locking said adjusting member against rotation relative to said tubular extension and to secure the gauge blades in predetermined adjusted position.

4. Gauge structure of the class described which includes a frame, gauge blades mounted in said frame for expansion and contraction movements, and means for expanding and contracting said blades which includes an elongated stem mounted in said frame for axial shift movement only, a tubular extension extending away from said frame enclosing said stem, a rotatable adjusting member mounted on the outer end of said extension and having a depending tubular part extending rotatably within said extension where it threadedly receives one end of said stem, a sleeve member surrounding said tubular part and fixed to said extension, means on said tubular part preventing outward displacement of the latter from said sleeve and extension, and means carried by said extension and operatively engageable with said tubular part to prevent rotation of the latter and said adjusting member.

5. In gauge structure of the class described, a frame having at least one end member with slideways therein, gauge blades having their end edges slidably fitted in said guideways, and means for expanding and contracting said blades which includes a stem mounted in said frame for axial slide movement, an expanding device carried by said stem within said frame and engageable with said gauge blades, exteriorly applied means constantly tending to contract said blades, said stem being of a length to extend beyond said frame and having its extended end threaded, a tubular member carried by said frame and surrounding the extended portion of said stem, an adjusting member rotatably mounted on the end of said tubular member opposite said frame, and having a depending tubular part extending rotatively within said tubular member, said tubular part being internally threaded to receive the threaded end of said stem to shift the latter axially as said adjusting member is rotated.

6. In gauge structure of the class described, a frame, gauge blades carried by said frame, and means for expanding and contracting said blades which includes a stem mounted in said frame for axial slide movement, an expanding device carried by said stem within said frame and engageable with said gauge blades, said stem being of a length to extend beyond said frame and having its extended end threaded, a tubular member carried by said frame and surrounding the extended portion of said stem, an adjusting member rotatably mounted on the end of said tubular member opposite said frame, and having a depending tubular part extending within said tubular member, said tubular part being internally threaded to receive the threaded end of said stem to shift the latter axially as said adjusting member is rotated, and means carried by said tubular member and adjustable to engage said tubular part to hold said tubular part and adjusting member in any particular position to which they may be rotated.

7. In gauge structure of the class described, a frame, adjustable gauge elements carried by said frame, means for adjusting said elements including an axially shiftable stem carried by and of a length to extend away from said frame, a tubular member surrounding said extending stem portion, a rotatable adjusting member carried by said tubular member and operatively connected to said stem to shift the latter axially, and means indicating the extent of adjustment of said adjusting member which includes a stationary part on said tubular member having an indicating mark thereon, an axial extension on said adjusting member, a graduated indicator disk rotatably mounted on said axial extension and seated on said adjusting member with its graduations adapted to register with said mark, and adjustable means on said axial extension adapted to lock said disk to said adjusting member in any desired position relative thereto.

8. In gauging structure of the class described, gauging elements, means for adjusting said elements which includes a stationary member having an adjustment-indicating mark thereon, an adjusting member rotatably carried by said stationary member and having a centrally-disposed extension thereon, a graduated disk rotatably mounted upon said extension and seated upon said adjusting member with its graduations adapted to register with said mark, and a locking member on said extension adapted to lock said disk to said adjusting member in any desired and relatively rotated position thereon.

9. In gauging structure of the class described, gauging elements, means for adjusting said elements which includes a stationary member having an adjustment-indicating mark thereon, an adjusting member rotatably carried by said stationary member and having a centrally-disposed extension thereon, a graduated disk rotatably mounted over said extension and seated upon said adjusting member with its graduations adapted to register with said mark, a lock nut on said extension, a member non-rotatably but slidably carried by said extension between said disk and lock nut, whereby tightening of said lock nut shifts said non-rotatable member along said extension to engage said disk and lock the latter in any desired rotary position relative to said adjusting member.

10. In gauging structure of the class disclosed which comprises gauging elements, means for adjusting said elements which includes a fixed member having an indicating mark thereon, a circular adjusting member rotatably carried by said fixed member, a circular graduated plate of substantially the same diameter as said adjusting member rotatably mounted on said adjusting member with its graduations adapted to register with said mark, and means for locking said plate to said adjusting member in any desired position of rotation relative thereto.

11. In gauging structure which comprise a frame, gauging elements supported thereby for radial expansion and contraction movements, means for adjusting said elements including a fixed frame part having an indicating mark thereon, an adjusting member rotatably carried by said frame part in close proximity to said mark, a graduated disk rotatably mounted on said adjusting member with its graduations adapted to register with said mark, and means for locking said disk to said adjusting member in any desired position of rotation relative thereto without interfering with the rotatability of said adjusting member.

12. In gauging structure which comprise a frame, gauging elements supported thereby for radial expansion and contraction movements, means for adjusting said elements including a fixed frame part having an indicating mark thereon, an adjusting member rotatably carried by said frame part in close proximity to said mark, a graduated disk rotatably mounted on said adjusting member with its graduations adapted to register with said mark, means for locking said disk to said adjusting member in any desired position of rotation relative thereto without interfering with the rotatability of said adjusting member, and means for locking said adjusting member in any position of rotation.

HERMAN W. ZIMMERMAN.